United States Patent
Dufty (12) 
(10) Patent No.: US 6,457,903 B1
(45) Date of Patent: Oct. 1, 2002

(54) ROLLING APPARATUS

(76) Inventor: Raymond Jeffrey Dufty, P.O. Box 70, Southport 4215 (AU)

( * ) Notice: Subject to any disclaimer, the term of this patent is extended or adjusted under 35 U.S.C. 154(b) by 0 days.

(21) Appl. No.: 09/486,025

(22) PCT Filed: Aug. 21, 1998

(86) PCT No.: PCT/AU98/00668

§ 371 (c)(1),
(2), (4) Date: May 17, 2000

(87) PCT Pub. No.: WO99/09809

PCT Pub. Date: Mar. 4, 1999

(30) Foreign Application Priority Data

Aug. 21, 1997 (AU) .......................... 35204/97

(51) Int. Cl.$^7$ ................................ A01G 1/12
(52) U.S. Cl. .................. 404/122; 172/21; 172/118; 47/1.01 R
(58) Field of Search ............... 172/21, 22, 42, 172/118, 120, 121, 122, 540, 554; 47/1.01 R; 404/122, 123, 124, 125, 127, 131

(56) References Cited

U.S. PATENT DOCUMENTS

| | | | | |
|---|---|---|---|---|
| 1,187,251 A | * | 6/1916 | Bultman | 404/125 |
| 3,009,401 A | * | 11/1961 | Greiner | 404/123 |
| 3,807,504 A | | 4/1974 | Nunes, Jr. | |
| 4,776,404 A | | 10/1988 | Rogers et al. | |
| 4,993,499 A | * | 2/1991 | Bourgault et al. | 172/294 |
| 5,064,000 A | | 11/1991 | Dover et al. | |
| 5,337,833 A | * | 8/1994 | Rizzo | 172/520 |
| 5,468,267 A | * | 11/1995 | Dufty et al. | 47/1.01 R |
| 5,641,025 A | | 6/1997 | Kawaguchi | |
| 6,131,378 A | * | 10/2000 | Lees | 56/7 |

FOREIGN PATENT DOCUMENTS

| | | | | |
|---|---|---|---|---|
| AU | 17975/56 | | 7/1957 | |
| EP | 0067243 | * | 12/1982 | 404/125 |
| IT | 575292 | * | 4/1958 | 404/125 |

OTHER PUBLICATIONS

Derwent Abstract Accession No. 88–284364/40, Class P11, SU 1384232 A (Sibe Agric Mechn EL) Mar. 30, 1988, Abstract.

* cited by examiner

*Primary Examiner*—Thomas B. Will
*Assistant Examiner*—Nathan Mammen
(74) *Attorney, Agent, or Firm*—Mathews, Collins, Shepherd & McKay, P.A.

(57) ABSTRACT

Rolling apparatus for rolling of turf or grass surfaces including a mobile main frame (11) and one or more undercarriages (45, 46) attached to the main frame (11) wherein the or each undercarriage has one or more smoothing rollers (45A, 46A) and there is further provided a control (62) pivotally attached to the main frame (11) wherein the or each undercarriage is pivotally attached to the control such that, in use, the or each smoothing roller closely follows ground contours.

7 Claims, 10 Drawing Sheets

ROLLING APPARATUS

FIELD OF THE INVENTION

THIS INVENTION relates to rolling apparatus for rolling of turf or grass surfaces such as golfing greens and bowling greens.

BACKGROUND OF THE INVENTION

Conventional rolling apparatus is described in International Publication WO93/19582 and comprises a mobile main frame and an undercarriage having at least three ground contacting or smoothing rollers which are unevenly spaced, said undercarriage being pivotally attached by a universal pivot joint to the main frame wherein the undercarriage is pivotabie with respect to the main frame in any direction The main frame includes a ground engaging roller driven by drive means located on the main frame. The main frame is driven in a line of travel normal to the longitudinal axis of any one of the three smoothing rollers which were all oriented parallel to each other.

A similar arrangement to the rolling apparatus described above is described in AU 522301 with the fundamental difference however, being that in this reference, the three smoothing rollers were evenly spaced rather than being unevenly space as described in International Publication WO93/119582. Also, in Australian Patent 522301, there was provided coupling means between the undercarriage and the main frame which only allowed pivotal movement of he undercarriage with respect to the main frame about a longitudinal axis parallel to the direction of travel of the rolling apparatus and not about a horizontal axis normal to the direction of travel.

However, disadvantages that occurred in relation to the rolling apparatus described in both International Publication WO93/19532 and Australian Patent 522301 was in regard to rolling or smoothing of lawns that had an undulating or uneven surface. Such disadvantages included the following:

(i) in some cases, the three ground contacting rollers did not contact the surface of the lawn because of its uneven surface thereby impairing rolling efficiency of the rolling apparatus which necessitated repeated rolling operations to create an even, smooth surface; and (ii) the direction of rolling had to be carefully chosen to achieve an efficient rolling or smoothing operation, If the direction of rolling was inappropriate, then again it was necessary to carry out further or repeated rolling operations.

It was also found, in regard to conventional rolling apparatus as described above, that sometimes the smoothing rollers left indentation lines on lawns having an even surface as well as lawns having an uneven surface. Such indentation lines were unsightly and detrimental to achievement of a smooth and even grass surface.

Another disadvantage of conventional rolling apparatus as described above was that surface corrugations still remained in lawns in some cases after repeated rolling operations.

SUMMARY OF THE INVENTION

It therefore is an object of the invention to provide rolling apparatus that may alleviate one or more of the abovementioned disadvantages of the prior art The invention, therefore, provides rolling apparatus for the rolling of turf or grass surfaces which include a mobile main frame and at least a pair of undercarriages attached to the main frame in side-by-side relationship wherein each undercarriage has one or more smoothing rollers and there is further provided a control arm or plate pivotally attached to the main frame about a horizontal axis wherein each undercarriage is pivotally attached to the control arm or plate and a transmission interconnecting each undercarriage to an operating lever or joystick wherein actuation of the operating lever or joystick causes reciprocatable pivotal movement of each undercarriage such that, in use the or each smoothing roller closely follows ground contours.

Preferably the control arm is pivotally attached to an undersurface of the main frame or undersurface of a frame member of the main frame. To this end, therefore, a pivot joint may be provided interconnecting the control plate or arm and the main frame which has a pivot pin pivotable about a horizontal axis which is accommodated in bushes or other suitable forms of bearings attached to the control arm and the main frame.

Each undercarriage may be formed in any suitable manner and may, for example, comprise a pair of opposed end frames or end plates interconnecting an intermediate plate or web forming the main body of the undercarriage. Thus, each undercarriage may be channel shaped, such as being U- or V-shaped or alternatively, may comprise an undercarriage plate omitting end frames or end plates, which undercarriage plate is oriented in a substantially horizontal plane in use. Suitably each end frame or plate may have rotatably mounted thereto the one or more smoothing rollers. Preferably there is provided a plurality of smoothing rollers which may be unevenly spaced or evenly spaced. Most preferably there are provided three smoothing rollers.

Each undercarriage is preferably pivotably attached to the control arm so as to be pivotable about a vertical axis. Preferably each undercarriage is pivotable universally about the vertical axis and this may be achieved by a universal pivot joint, such as a ball in socket, for example, or by each undercarriage having a spherical bearing interposed between an upright stud and an outer bearing housing.

Each of the three smoothing rollers may include a longitudinal axle extending the length of each roller which is attached to each end to an associated end frame or plate or alternatively, may be provided with stub axles at each end attached to an associated end frame or plate. Suitably each of the three smoothing rollers are substantially parallel with each other.

The main frame or chassis may overlie each undercarriage and the control arm. The main frame which is mobile may also support or carry at least one main ground contacting roller. There also may be provided drive means which is drivingly connected to the main roller for propelling or driving the rolling apparatus in a line of travel which is suitably normal to the longitudinal axis of at least one of the smoothing rollers.

Preferably a similar drive means may be utilized as described in Australian Patent 522301 which is mounted on the main frame. However, this is not essential and any suitable drive means may be utilized wherein an engine or motor, suitably of the internal combustion type, is mounted on a top surface of the main frame or chassis.

The motor may have an output shaft drivingly connected to the drive roller of the main frame via suitable gear means or belt-pulley mechanism.

The main frame is suitably supported by opposed ground engaging wheels located on each side thereof and suitably attached to the main frame by stub axles or other suitable axle means There also may be provided means for raising or lowering the ground engaging wheels when required for transportation or storage as described in International Publication WO93/19582.

Alternatively, raising or lowering of the wheels may be achieved as described in Australian Patent 522301.

In a preferred embodiment of the invention, there may be provided a pair of undercarriages which are each pivotally attached to the main frame or chassis along one side or one end thereof. One undercarriage may travel on level ground and the other undercarriage may traverse an inclined or oblique ground surface as shown in the drawings herein.

In another embodiment of the invention, there may be provided four or even six undercarriages which are each attached to the control arm as described above.

In each of the abovementioned embodiments the operating lever or joystick may be accessible to the driver of the rolling apparatus who may be located in a seat attached to an upper surface of the main frame. Preferably rotational movement of the joystick as a result of the interconnecting transmission causes reciprocatable pivotal movement of each undercarriage. In one form, this may be accomplished by an actuating arm interconnecting the joystick or extension or appendage thereof which moves in a reciprocatable fashion thereby causing its adjacent undercarriage, which is attached to the actuating arm, to also move in similar fashion. Also in this arrangement, each member of a pair of undercarriages may be interconnected by an appropriate linkage mechanism to ensure that once reciprocatable movement of one undercarriage is initiated then corresponding movement of the adjacent undercarriage may also occur, This may be achieved, for example, by the linkage mechanism having a linkage rod pivotally connected to pivot joints mounted to the chassis which undergoes reciprocatable movement after initial reciprocatable movement of the undercarriage having the actuating arm directly attached thereto. An example of such linkage mechanism is illustrated herein.

BRIEF DESCRIPTION OF THE DRAWINGS

Reference may now be made to a preferred embodiment of the invention as shown in the attached drawings, wherein.

DETAILED DESCRIPTION OF THE PREFERRED EMBODIMENT

In the drawings, the rolling apparatus 10 includes a main frame or chassis 11, seat 12 supported on support frame 13 comprising spaced front uprights 14, end upright 15 and cross member 16. Each of the uprights 14 and 15 are attached to hollow sockets 17, 18 and 19. This arrangement enables the support frame 13 to be lifted off chassis 11 in one piece. Fasteners 20 attach each upright to an associated socket 17, 18 and 19 There is also shown joystick or steering lever 22 having handle 22A mounted in support column 23 which extends upwardly from chassis 11 as shown.

Figure 10:
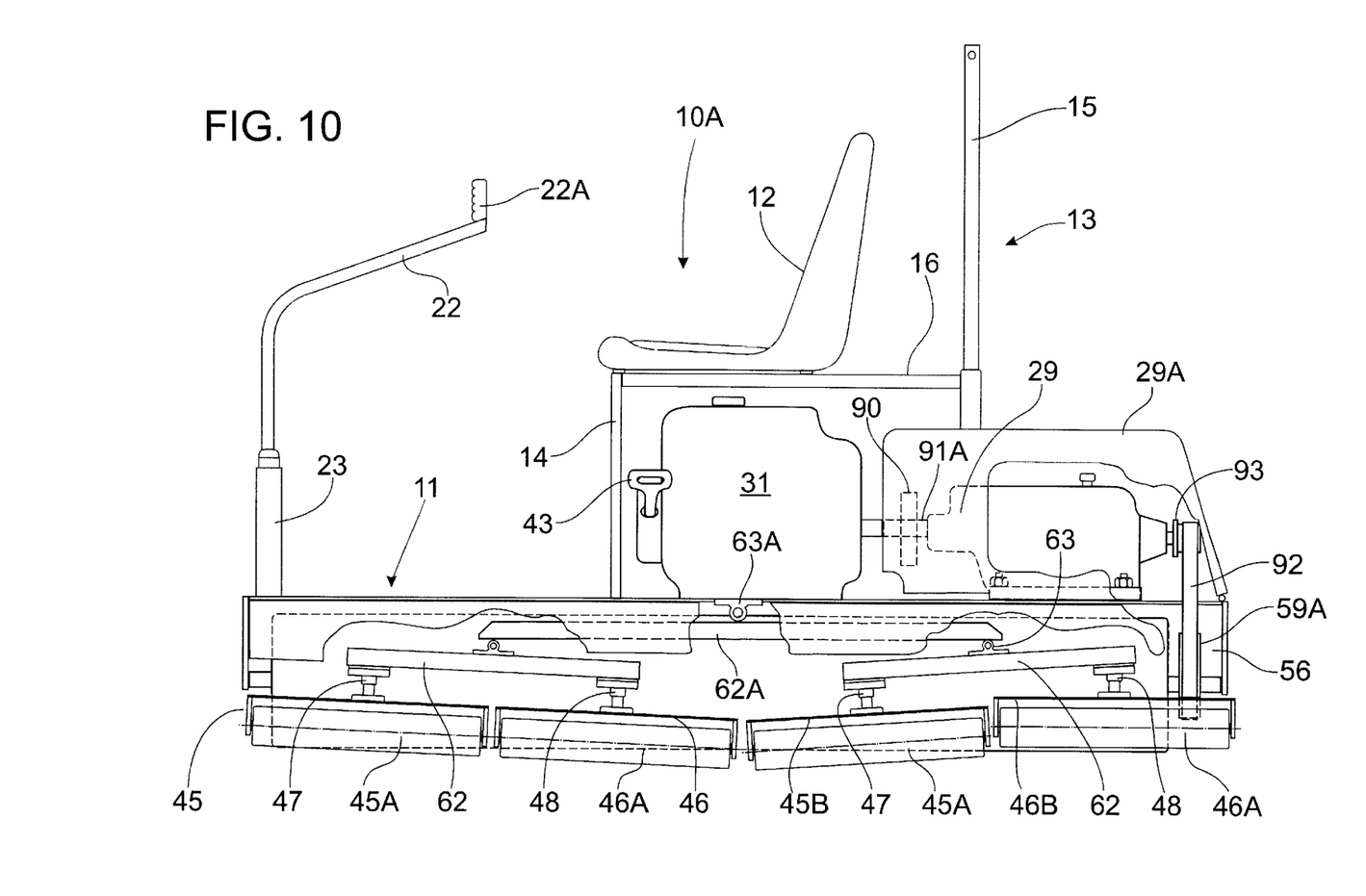
FIG. 10 is a side elevation of another form of rolling apparatus constructed in accordance with the invention.

There is also shown wheels 24 mounted to chassis 11 and floor mats 25. There is also shown control lever 26 having pedals 27 and 28 at each end which is connected to gear box 29 (best shown in FIG. 10) which is located in gear box housing 29A by an interconnecting shaft (not shown) which allows the chassis 11 to be driven to the left or right as may be required. Gear box 29 is connected to motor 31 as shown in FIG. 10. There is also shown catch 29B for attachment of gear box housing to chassis 11.

There is also shown a U-shaped trailer frame 32 having drawbar 33, hitch 34, trailer arms 35 which are rigidly connected to a respective wheel 24, shock absorber 36 supported on mounting strut 37 and chassis 11 and attached thereto by pivot mounts 38A and pivot rod 38 which enables trailer frame 32 to be pivoted from an operative position as shown to an inoperative position (not shown) wherein each wheel 24 may be elevated to a non-travelling position and thus are supported on the chassis 11. There is also shown catch 41 which locks trailer frame 32 in the lowered or operative position. Catch 41 may engage with lug 42 attached to upright 15 to support the trailer frame 32 in the inoperative position. The engine 31 has pull start lever 43.

The chassis 11 also includes mounting heads 45 and 46 to which are mounted respective unevenly spaced smoothing rollers 45A and 46A.

Figure 1:
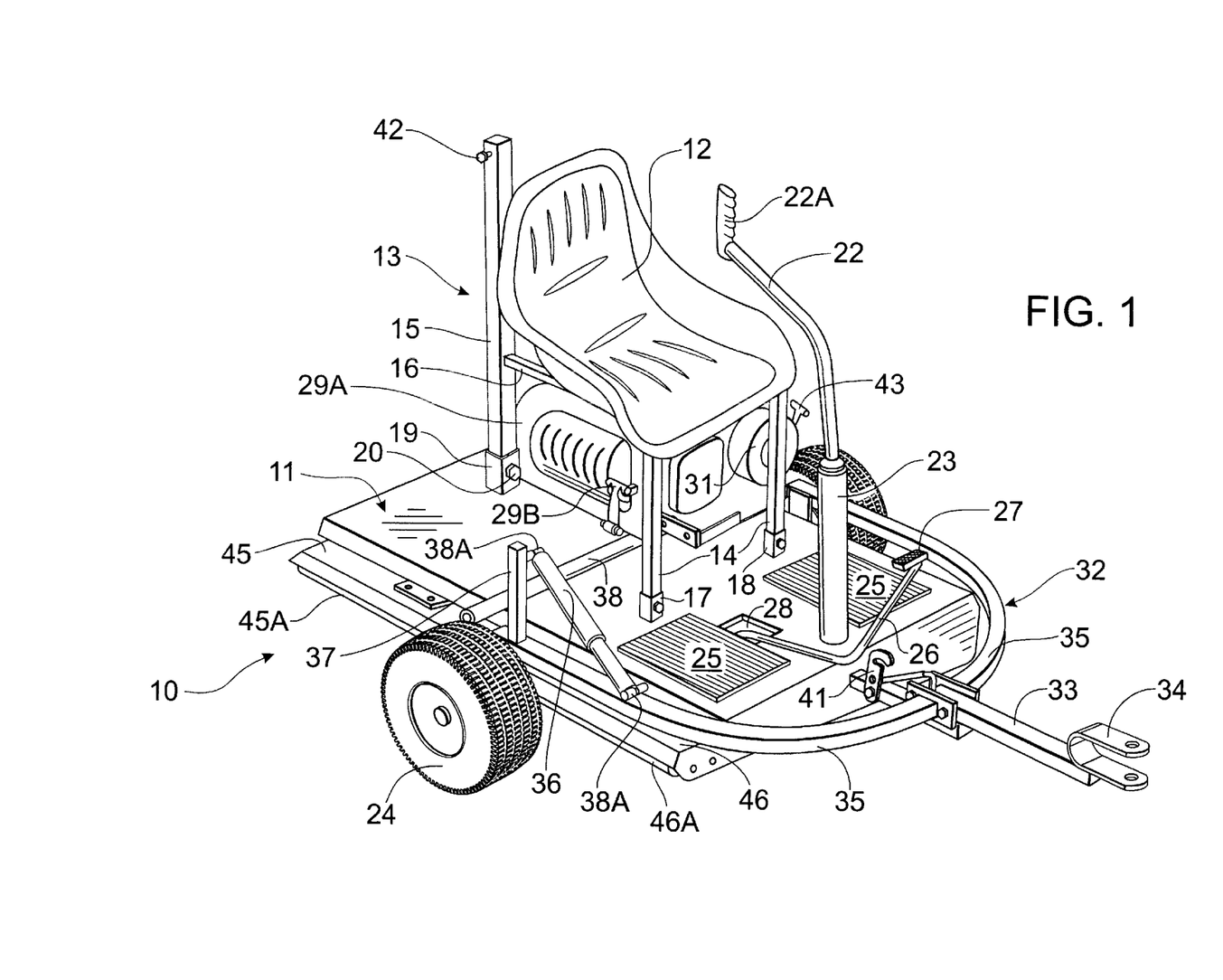
FIG. 1 is a perspective view of rolling apparatus constructed in accordance with the invention.
Figure 2:
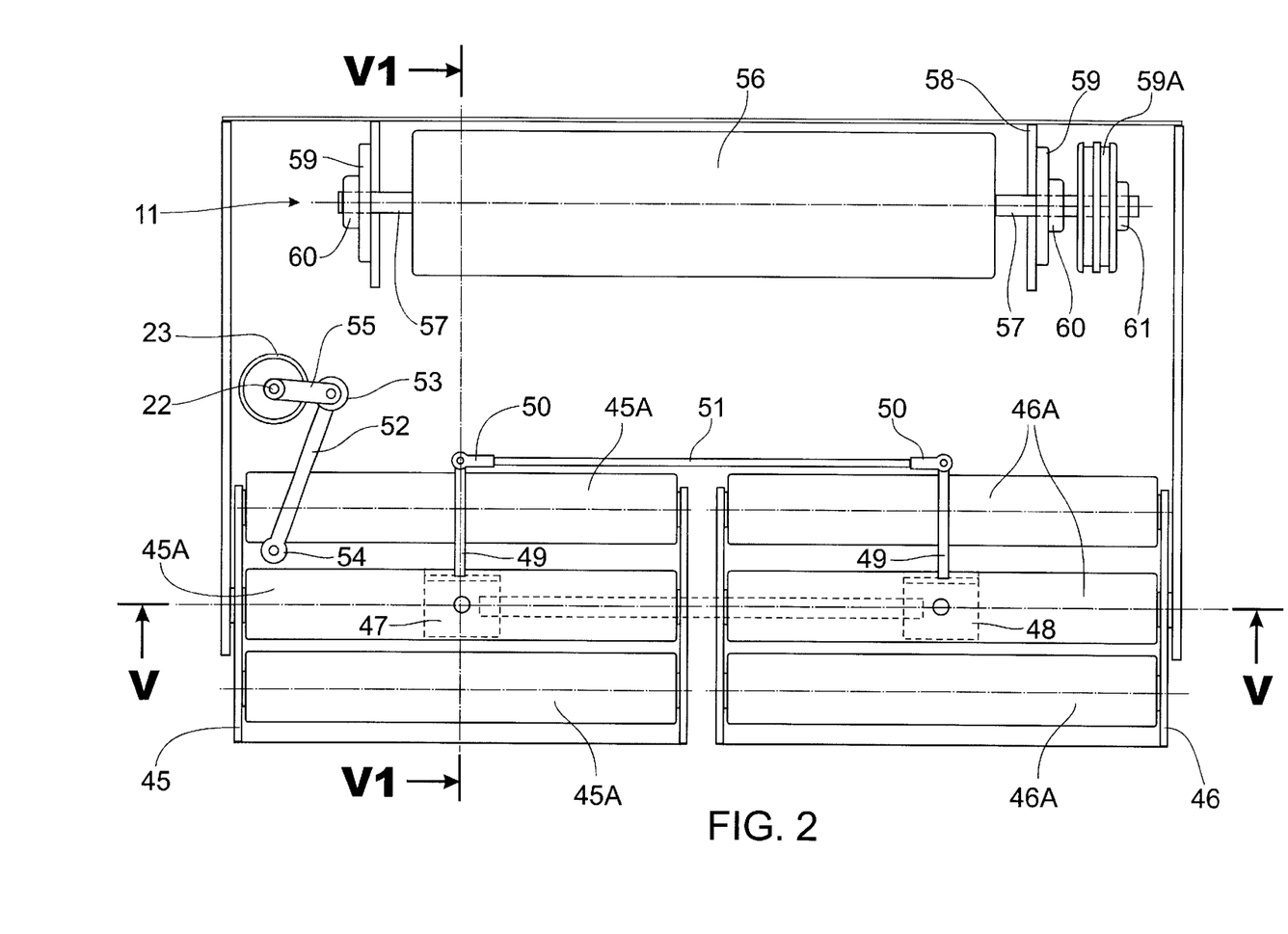
FIG. 2 is a plan view of the chassis of the rolling apparatus shown in FIG. 1.

In FIG. 2, there is also shown pivot assemblies 47 and 48 and connecting arms 49 which each interconnect pivot assemblies 47 and 48 to pivot joints 50. There is also provided connection rod 51 which interconnects each pivot joint 50. There is also provided linkage rod 52 which interconnects pivot joints 53 and 54. Pivot joint-54 is attached to undercarriage 45 and pivot joint 53 is connected to steering arm 55.

There is also shown in FIG. 2 main drive roller 56 mounted on stub axles 57 which are attached to mounting plates 58 rigidly attached to chassis 11. Also shown are bearing carriers 59,-bearings 60, sprocket 59A and sprocket mounting sleeve 61.

Figure 3:
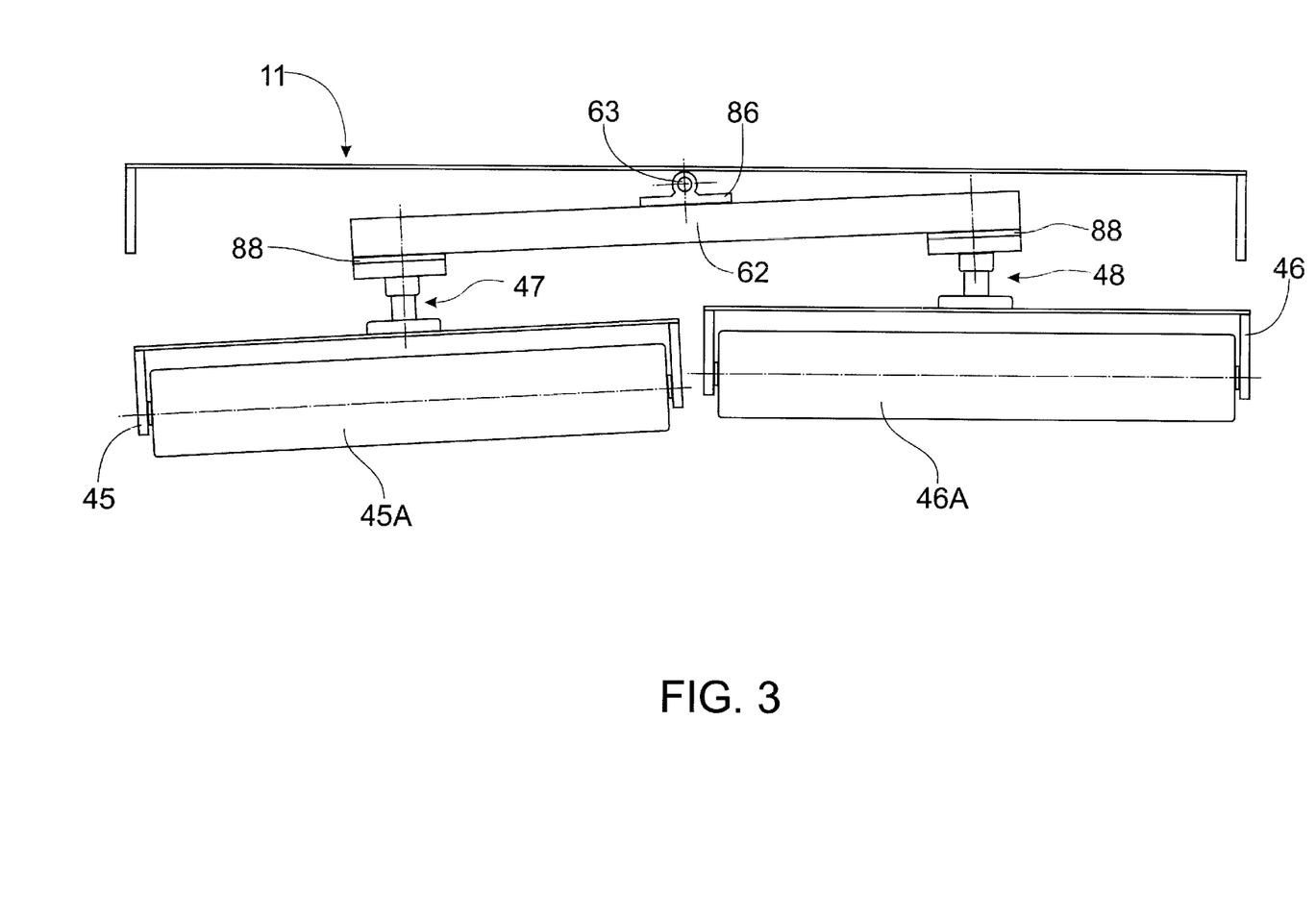
FIG. 3 is a side elevation of the chassis of the rolling apparatus shown in FIG. 1 showing pivotal movement of the control arm for each undercarriage in one orientation.
Figure 4:
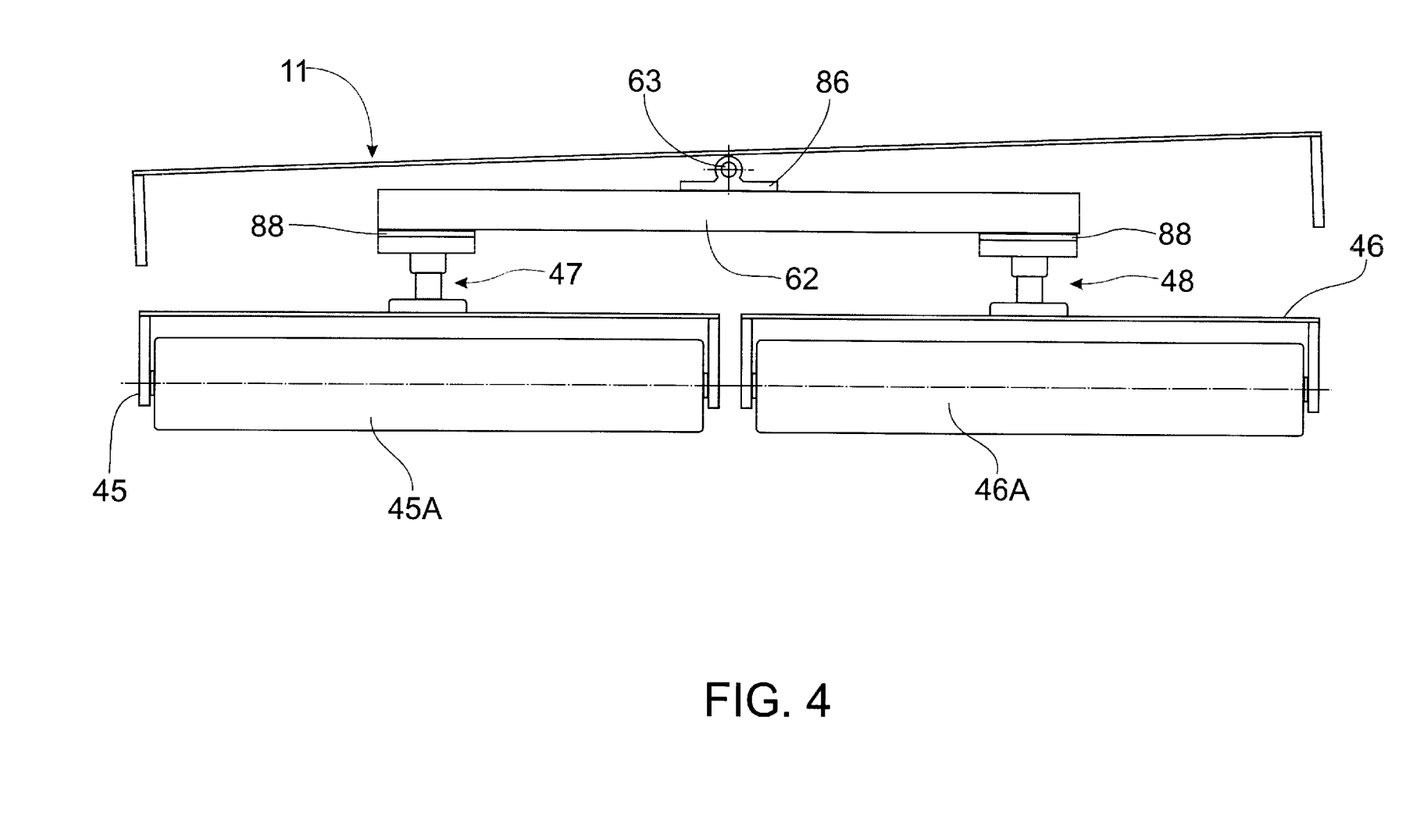
FIG. 4 is a similar view to FIG. 2 showing pivotal movement of the control arm in another orientation.
Figure 9:
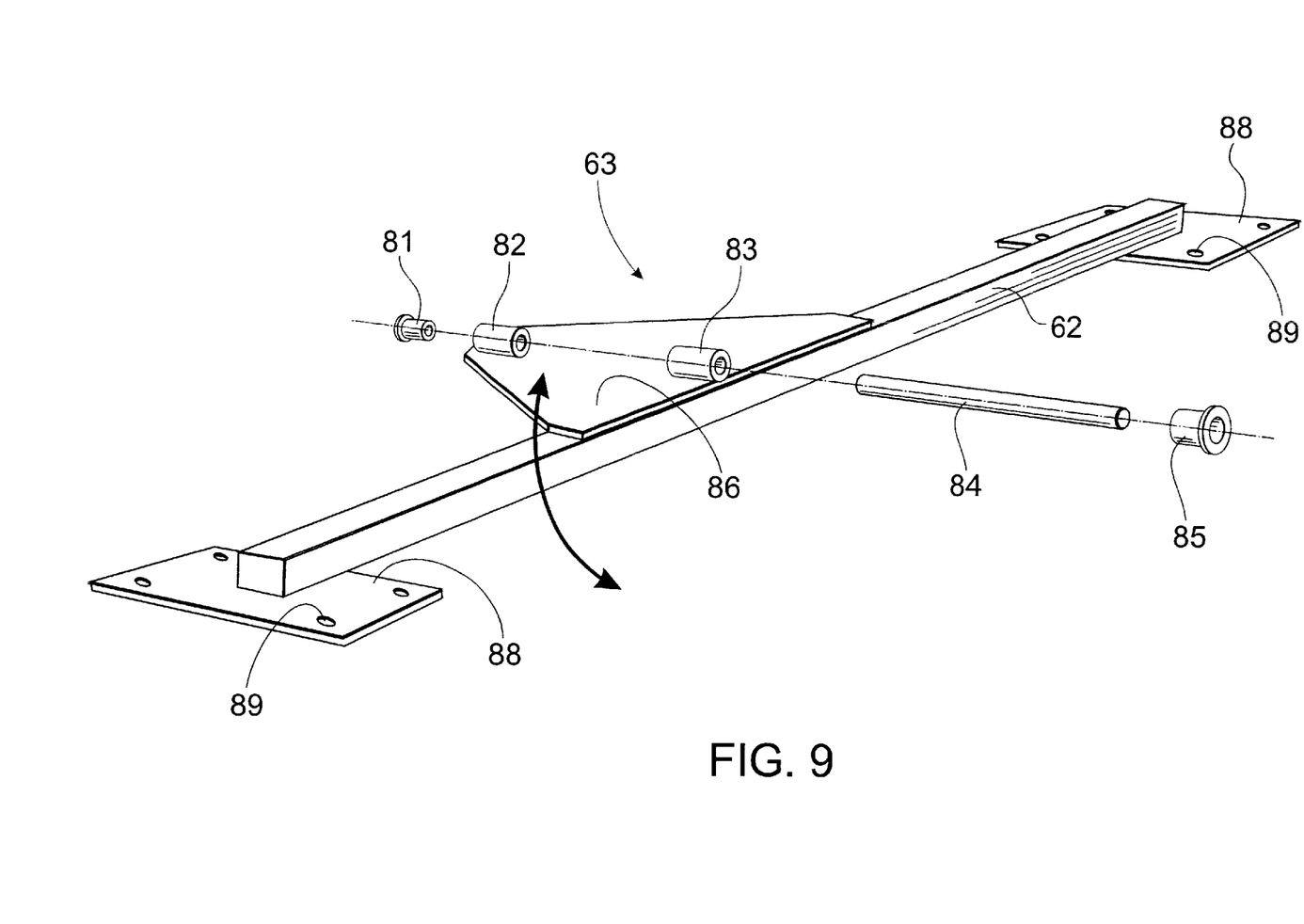
FIG 9 is an exploded perspective view showing the pivotal attachment of the control arm to the chassis.

In FIGS. 3–4, there are shown undercarriages 45 and 46 which are each attached to control arm 62 which is pivotally attached to chassis 11 by pivot joint 63 which is illustrated in detail in FIG. 9. The control arm 62 is attached to each undercarriage 45 and 46 by pivot assemblies 47 and 48.

Figure 5:
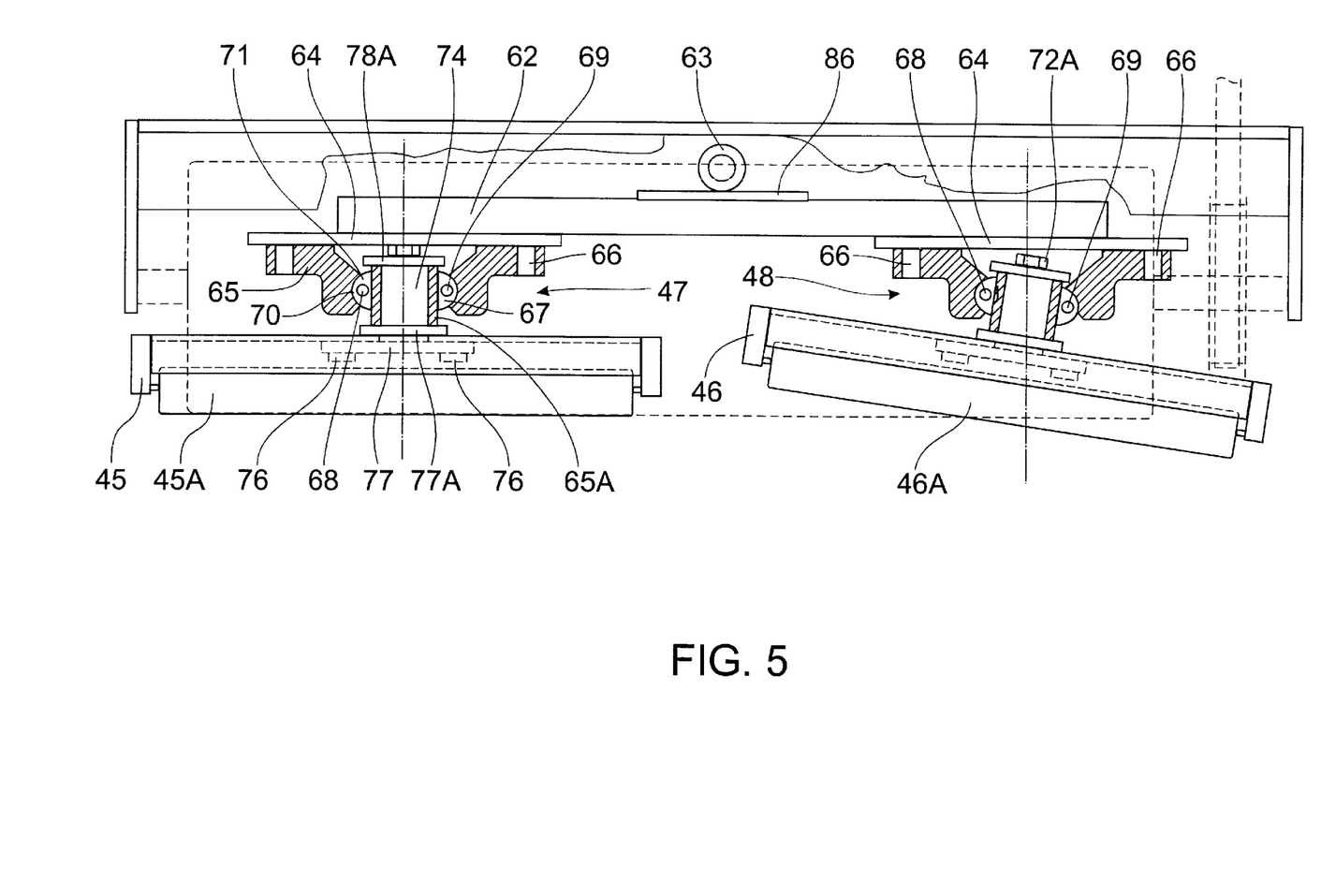
FIG. 5 is a sectional view of the chassis of FIG. 2 along the line V—V shown in FIG. 2 showing each smoothing roller in different orientations.
Figure 6:
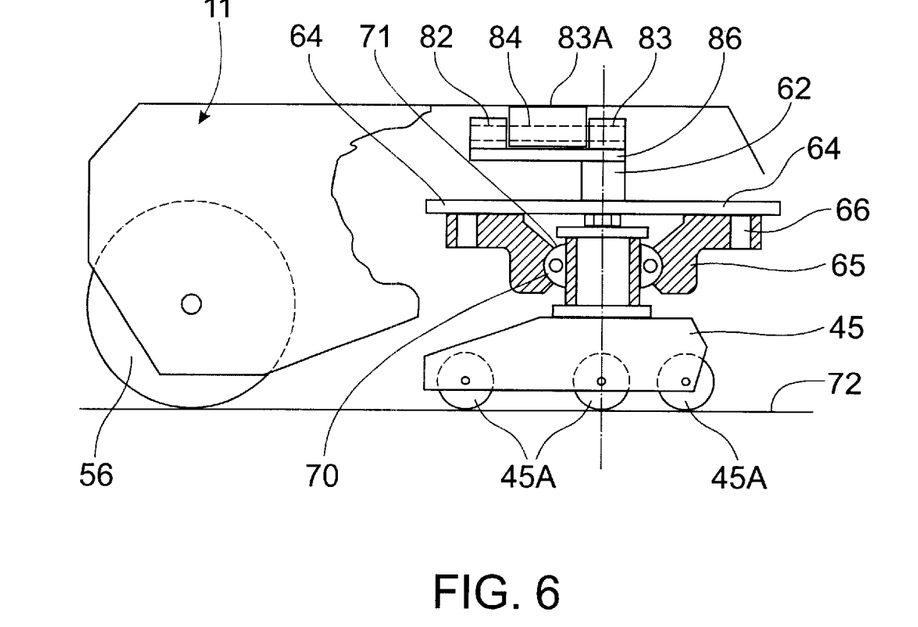
FIG. 6 is a sectional view of the chassis of FIG. 2 along the line VI—VI shown in FIG, 2 showing the smoothing rollers associated with one undercarriage travelling on a level surface.
Figure 7:
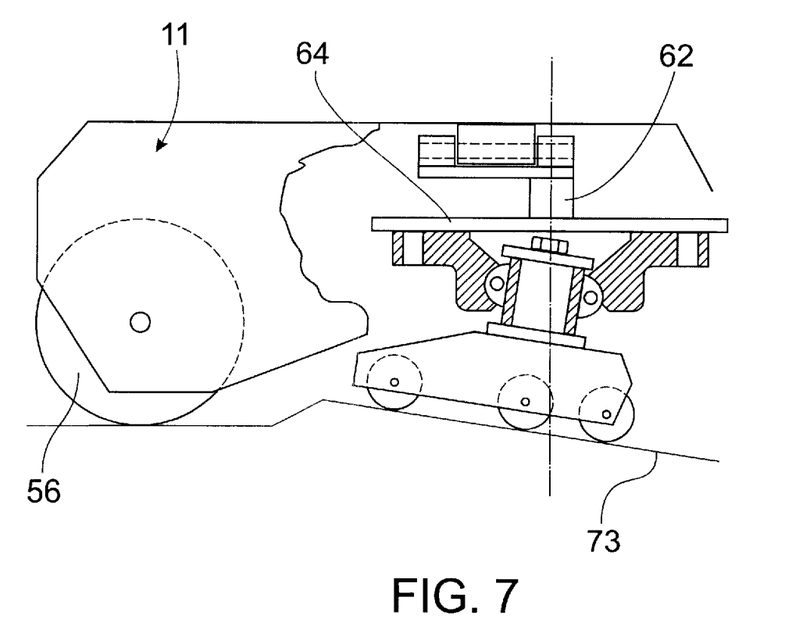
FIG. 7 is a similar view to FIG. 6 showing the smoothing roller travelling on an inclined surface.

As best shown in FIGS. 5, 6 and 7, each pivot assembly 47 and 48 includes an outer bearing housing 65 which are attached to attachment plate 64 by attachment bolts 66. There is also provided a spherical bearing 67 which is located in outer bearing housing 65. There is also provided inner bearing surface 65A. Both bearing housing 65 and bearing 67 have mating curved contact surfaces 70 and 71 as shown to enable the bearing 67 to pivot in a universal manner with respect to its associated bearing housing 65 as shown. In this regard, bearing 67 is provided with a number of balls 68 and 69. This enables each mounting head 45 to pivot from a position wherein each roller 46 travels on a level surface 72 to an inclined surface 73 as best shown in FIGS. 6–7.

Each bearing 67 is supported on a support stud 74 which extends into inner bearing housing 65A as shown. Support stud 74 is rigidly attached to each mounting head 45 by bolts 76 which engage with base plate 77 of support stud 74. There is also shown bolt 72A which attaches bearing housing 65A to stud 74, spacer 77A and washer 78A.

Figure 8:
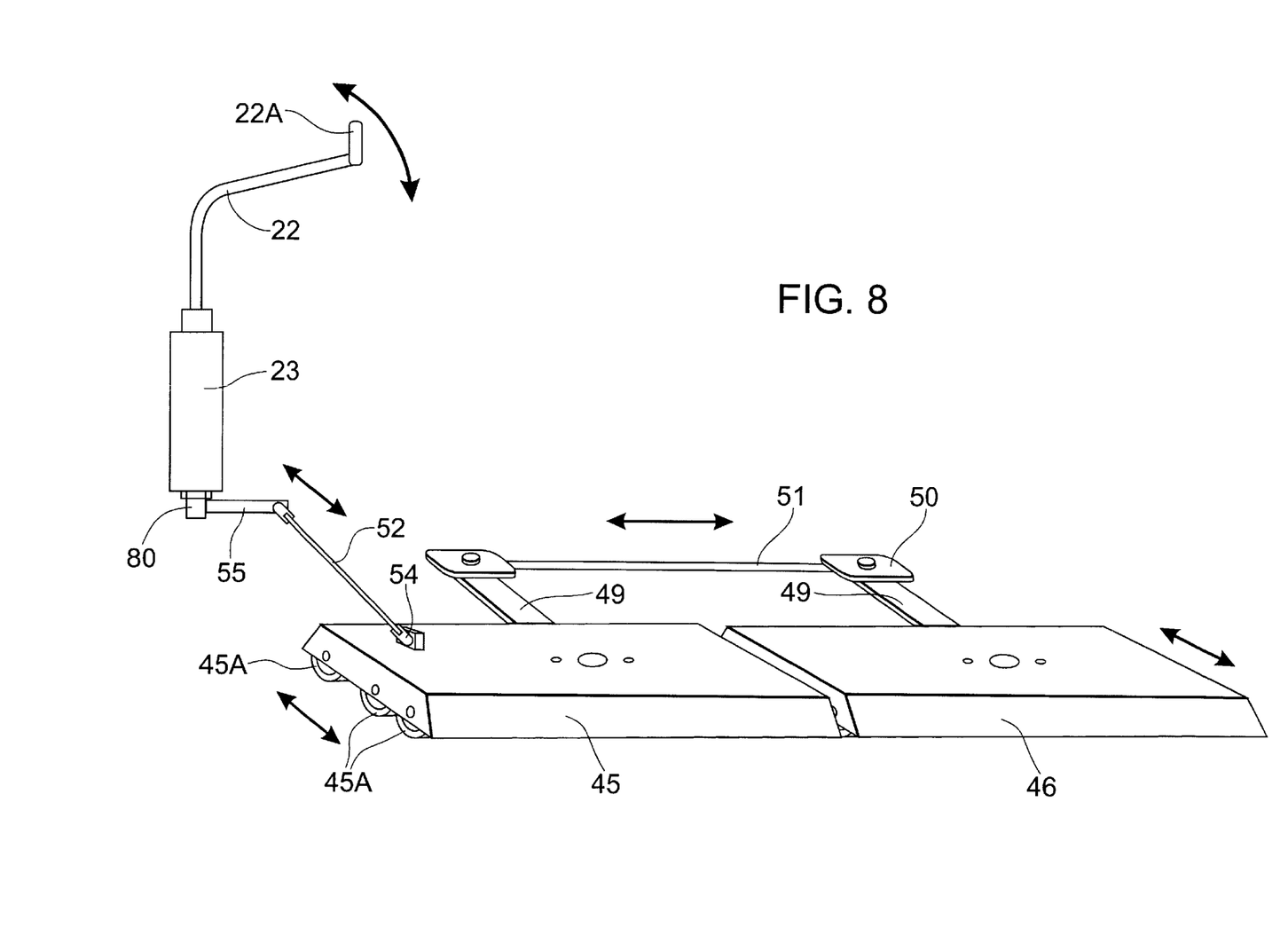
FIG. 8 is a schematic view of the control transmission from the steering rod or joystick to each undercarriage.

In FIG. 8, there is shown joystick 22, support column 23 which functions as a bearing housing for joystick 22 and joystick extension 80 which engages with steering arm 55 and causes steering arm 55 to rotate. The arrangement functions as shown in FIG. 8 wherein rotational movement of joystick 22 causes reciprocatable movement of control rod 52 to cause reciprocatable movement of undercarriage 45 as shown which translates directly to cause corresponding reciprocatable movement of control rod 51 which causes corresponding movement of undercarriage 46 as shown.

In FIG. 9, the pivot assembly 63 includes bush 81, pivot sockets 82 and 83 attached to mounting plate 86 which is welded to control arm 62, pivot pin 84 and bush 85, Bushes 81 and 85 engage in their corresponding pivot sockets 82 and 83 by interference fit to retain pivot pin 84 within bushes 81 and 85. The structure of pivot assembly 63, therefore, enables control arm 62 to pivot in the direction indicated by an arrow in solid outline. Carrier plates 88 are each attached to pivot assemblies 47 and 48 as shown in FIGS. 3-4 to bolts (not shown) extending through attachment apertures 89. In FIGS. 6–7, there is also shown intermediate bearing 83A for pivot pin 84 which is not shown in FIG. 9.

Figure 11:
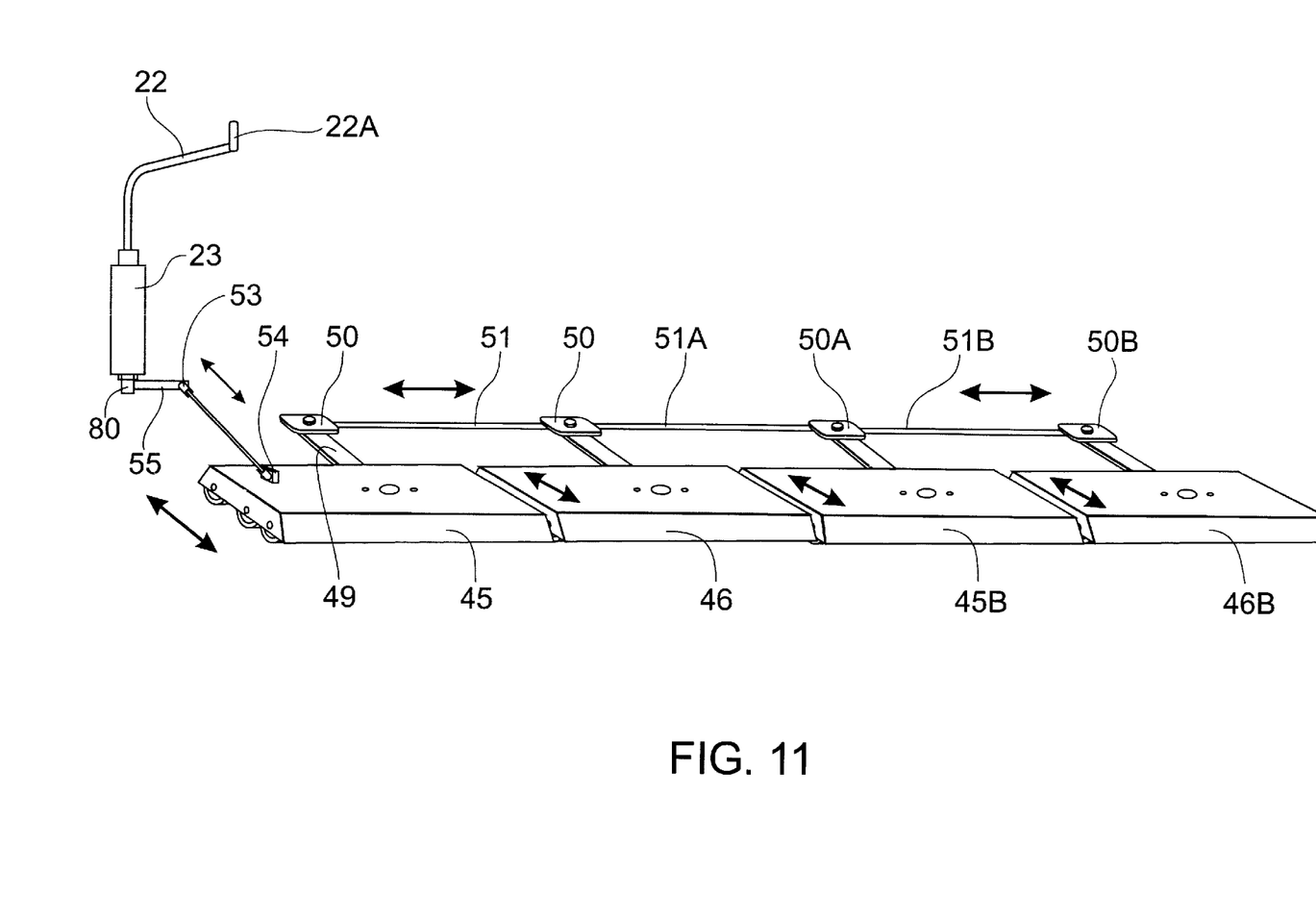
FIG. 11 is a view similar to FIG. 9 having reference to the rolling apparatus as shown in FIG. 10.

In FIG. 10, there is shown rolling apparatus 10A constructed in accordance with the invention which comprises two secondary control arms 62 which are each attached to a primary or central control arm 62A attached to chassis 11 by pivot assembly 63A. In this embodiment, each undercarriage 45, 46, 45B and 46B may undergo reciprocal movement as shown in FIG. 8 by the employment of a further control rods 51A and 51B and associated pivot joints 50A and 50B as shown in FIG. 11. Control rods 51A and 51B interconnect undercarriages 46, 45B and 46B as shown in FIG. 11.

In FIG. 10, there is also shown coupling 90 interconnecting output shaft 91 of motor 31 and input shaft 91A of gearbox 29 and chain 92 interconnecting sprocket 59A and sprocket 93 of gearbox 29 to therefore provide a drive train for main roller 56.

Having regard to the preferred embodiment of the invention as described above, it will be appreciated that by the provision of control arm 62 which is pivotally attached to the main frame 11 preferably about a horizontal axis in the FIGS. 1–9 embodiment or control means in the form of primary control arm 62A and secondary control arms 62 in the FIGS. 10–11 embodiment and by each undercarriage being pivotally attachable to control arm 62 that this enables the smoothing rollers 45A and 46A to "contour hug" the ground whereby each of the undercarriages are pivoted about their vertical axes simultaneously as the direction of travel of the main frame 11 is altered. This enables the production of a smooth, true surface which maybe applied to golfing greens, bowling greens and the like, removal of surface irregularities and pitch marks and the main frame to travel at extra speed when compared to prior art rolling apparatus.

The side-by-side arrangement of each undercarriage 45 and 46 as shown in the drawings, for example, in FIG. 2 also is extremely advantageous because each undercarriage counterbalances the other so that an even load is imparted to the turf or grass surface by the mobile frame 11.

It will also be appreciated by the feature of the transmission interconnecting each end carriage and the actuating lever 22 as shown in FIG. 8 or FIG. 11 that each undercarriage is caused to undergo reciprocatable pivotal movement which thereby controls such pivotal movement of the undercarriage and thus enhances operational efficiency of the rolling apparatus as a whole.

What is claimed is:

1. Rolling apparatus for rolling of turf or grass surfaces comprising:
   a mobile main frame;
   a control arm or plate pivotally attached to the main frame about a horizontal axis;
   at least a pair of undercarriages pivotally attached to the control arm or plate and disposed in a side-by-side relationship wherein each undercarriage has one or more smoothing rollers; and
   a transmission interconnecting each undercarriage to an operating lever or joystick, the transmission including an actuating arm which interconnects the operating lever or joystick or extension or appendage thereof and an adjacent undercarriage, wherein actuation of the operating lever or joystick causes reciprocatable pivotal movement of each undercarriage such that, in use, the or each smoothing roller closely follows ground contours.

2. Rolling apparatus as claimed in claim 1 wherein said transmission also includes a linkage mechanism interconnecting the pair of undercarriages to ensure that once reciprocatable movement of one undercarriage is initiated, then corresponding movement of an adjacent undercarriage occurs.

3. Rolling apparatus as claimed in claim 2 wherein the linkage mechanism has a linkage rod pivotally attached to the main frame at each end thereof.

4. Rolling apparatus for rolling of turf or grass surfaces comprising:
   a mobile main frame;
   a primary control arm pivotally mounted to the main frame about a horizontal axis;
   at least a pair of secondary control arms pivotally attached to the primary control arm;
   at least a pair of undercarriages pivotally attached to the secondary control arm and disposed in a side-by-side relationship wherein each undercarriage has one or more smoothing rollers; and
   a transmission interconnecting each undercarriage to an operating lever or joystick wherein actuation of the operating lever or joystick causes reciprocatable pivotal movement of each undercarriage such that, in use, the or each smoothing roller closely follows ground contours.

5. Rolling apparatus as claimed in claim 4 wherein each pair of undercarriages are interconnected by a linkage rod whereby each undercarriage is capable of movement in a reciprocatable fashion in unison when required.

6. Rolling apparatus for rolling of turf or grass surfaces comprising:
   a mobile main frame;
   a control arm or plate pivotally attached to the main frame about a horizontal axis;

at least a pair of undercarriages connected to the control arm by a universal pivot joint and disposed in a side-by-side relationship wherein each undercarriage supports a plurality of smoothing rollers;

a transmission interconnecting each undercarriage to an operating lever or joystick wherein actuation of the operating lever or joystick causes reciprocatable pivotal movement of each undercarriage such that, in use, the or each smoothing roller closely follows ground contours.

7. Rolling apparatus as claimed in claim 6 wherein each undercarriage supports three unevenly spaced rollers.

* * * * *